United States Patent
Haran (10) Patent No.: US 7,818,648 B2
(45) Date of Patent: Oct. 19, 2010

(54) GPON ROGUE-ONU DETECTION BASED ON ERROR COUNTS

(75) Inventor: Onn Haran, Even Yehuda (IL)

(73) Assignee: PMC-Sierra Israel Ltd., Herzliya (IL)

(*) Notice: Subject to any disclaimer, the term of this patent is extended or adjusted under 35 U.S.C. 154(b) by 954 days.

(21) Appl. No.: 11/636,541

(22) Filed: Dec. 11, 2006

(65) Prior Publication Data

US 2007/0143645 A1  Jun. 21, 2007

Related U.S. Application Data

(63) Continuation-in-part of application No. 11/564,299, filed on Nov. 29, 2006.

(60) Provisional application No. 60/778,401, filed on Mar. 3, 2006.

(51) Int. Cl.
*H03M 13/00* (2006.01)

(52) U.S. Cl. .................. 714/752; 714/704; 398/78

(58) Field of Classification Search .......... 714/704, 714/752; 398/78
See application file for complete search history.

(56) References Cited

U.S. PATENT DOCUMENTS

| | | | |
|---|---|---|---|
| 6,288,806 B1 * | 9/2001 | Touma et al. ................. 398/5 |
| 6,690,884 B1 * | 2/2004 | Kelty et al. ................. 398/27 |
| 6,918,069 B2 * | 7/2005 | Grandi et al. ............... 714/704 |
| 7,301,968 B2 | 11/2007 | Haran et al. | |
| 7,600,171 B2 * | 10/2009 | Lee et al. ................... 714/751 |
| 7,606,487 B1 * | 10/2009 | Anslow et al. ............... 398/27 |
| 7,662,165 B2 * | 2/2010 | Gilson et al. ............... 606/200 |
| 2002/0171895 A1 * | 11/2002 | Chang ........................ 359/168 |
| 2004/0114936 A1 * | 6/2004 | Sugihara et al. ............. 398/147 |
| 2005/0041972 A1 * | 2/2005 | Kim et al. ..................... 398/78 |
| 2007/0143645 A1 | 6/2007 | Haran | |

OTHER PUBLICATIONS

"*Gigibit-capable Passive Optical Networks (G-PON): General characteristics*" International Telecommuication Union G.984.1, Mar. 2003.

"*Gigibit-capable Passive Optical Networks (G-PON): Physical media Dependent (PMD) layer specification*" International Telecommuication Union G.984.2, Mar. 2003.

(Continued)

*Primary Examiner*—Esaw T Abraham
(74) *Attorney, Agent, or Firm*—Mark M. Friedman (57) ABSTRACT

A system, for identifying faults in a GPON that includes an OLT and a plurality of ONUs, including: a global error-counter, coupled to the OLT, for counting FEC-correctable errors, for each ONU, from a data stream from the GPON; and a CPU for extracting an ONU status, indicative of a faulty ONU, contingent on the errors from the global error-counter. A system, for identifying faults in a GPON that includes an OLT and a plurality of ONUs, including: a grant-start error-counter, coupled to the OLT, for counting grant-start errors, for each ONU, from a data stream from the GPON; a grant-end error-counter, coupled to the OLT, for counting grant-end errors for each ONU; and a CPU for extracting an ONU status, indicative of a faulty ONU, contingent on a parameter selected from the group consisting of the grant-start errors, the grant-end errors, and a combination thereof.

9 Claims, 7 Drawing Sheets

OTHER PUBLICATIONS 802.3 "Part 3: Carrier sense multiple access with collision detection (CSMA/CD) access method and physical layer specifications" IEEE Computer Society. Dec. 2005.

802.3 "Part 3: Carrier sense multiple access with collision detection (CSMA/CD) access method and physical layer specifications" Section Two IEEE Computer Society. Dec. 2005.

802.3 "Part 3: Carrier sense multiple access with collision detection (CSMA/CD) access method and physical layer specifications" Section Three IEEE Computer Society. Dec. 2005.

802.3 "Part 3: Carrier sense multiple access with collision detection (CSMA/CD) access method and physical layer specifications" Section Four IEEE Computer Society. Dec. 2005.

802.3 "Part 3: Carrier sense multiple access with collision detection (CSMA/CD) access method and physical layer specifications" Section Five IEEE Computer Society. Dec. 2005.

"Gigibit-capable Passive Optical Networks (G-PON): Transmission convergence layer specification" International Telecommunication Union G.984.3, Mar. 2003.

* cited by examiner

GPON ROGUE-ONU DETECTION BASED ON ERROR COUNTS

The present application claims the benefit of U.S. Provisional Patent Application No. 60/778,401 filed Mar. 3, 2006. The present application is also a continuation-in-part (CIP) application to U.S. patent application Ser. No. 11/564,299, filed Nov. 29, 2006, which claims the benefit of PCT Patent Application No. PCT/IL05/001358, filed Dec. 19, 2005, which claims the benefit of U.S. Patent Application No. 60/699,879 filed Jul. 18, 2005.

FIELD AND BACKGROUND OF THE INVENTION

The present invention relates generally to passive optical networks (PON) and more particularly to active real time monitoring of such networks, and to detection of a rogue optical-network unit (ONU) in gigabit PON (GPON) environments.

Passive optical networks, and in particular Ethernet PONs (EPONs) are known, and described for example in U.S. Patent Application No. 20020196801 by Haran et al. The debugging of a running/active network in a shared media network environment is difficult. At the same time, the ability to proactively monitor the network and to verify that its behavior is correct is valuable. Isolating transmission errors (or simply "errors"), detecting the cause of an error and providing debugging tools are highly desired features in a network environment.

A major goal in a PON that comprises an optical line terminal (OLT) and a plurality of optical network units (ONUs) is to detect degradation in the network behavior before customer complains, namely before errors are evident on the line. The most critical aspect is fault isolation, i.e. finding a faulty ONU before it harms the performance of other ONUs. The specific fault of the ONU is less important, because the faulty ONU is likely to be replaced by the network operator.

Figure 1A:
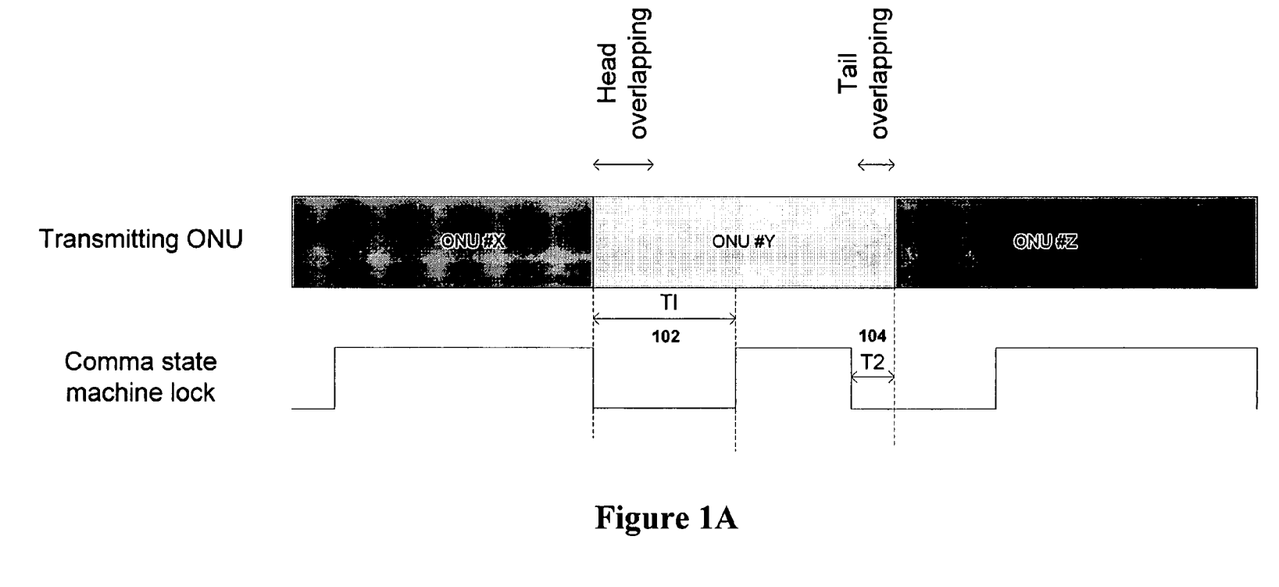
FIG. 1A shows a transmission timing diagram of several ONUs.
Figure 1B:
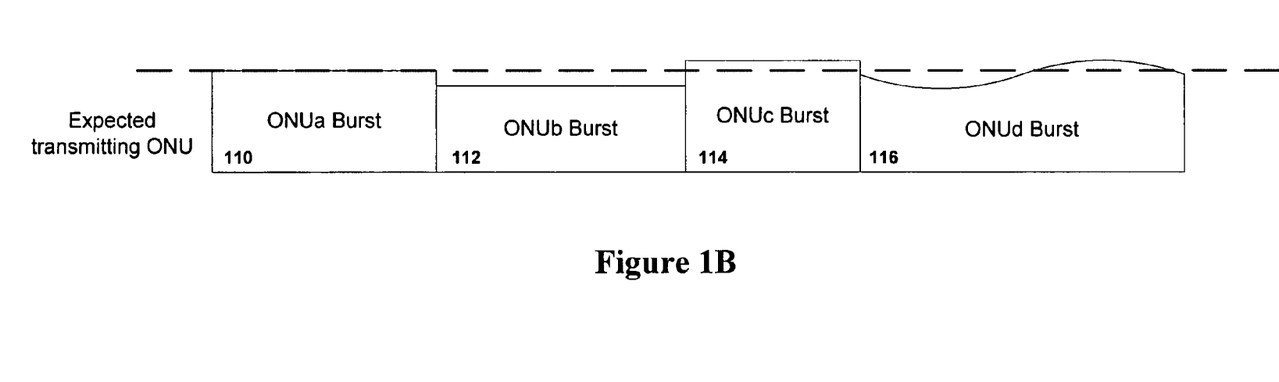
FIG. 1B shows a transmission power level diagram of several ONUs.

A PON may suffer from one or more of a number of failure modes (malfunctions or problems), either time-related ("temporal") or laser-power related ("power"), as shown respectively in FIGS. 1A and 1B. FIG. 1A shows potential temporal malfunctions in a PON comprising 3 ONUs X, Y and Z. In FIG. 1A, the transmission pattern includes two collision zones, a zone 102 between ONU X and ONU Y and a zone 104 between ONU Y and ONU Z. Zone 102 represents a case in which either ONU X stopped transmission after its expected stop time, or ONU Y began transmission after its expected start time. Zone 104 represents a case in which either ONU Y stopped transmission before its expected stop time, or ONU Z started transmission before its expected start time. T1 is the time needed to reach the "sync-lock" or "gain" state of the grant to ONU Y (grant Y), this time also referred to herein as "sync-lock time". T2 is the time needed to reach the end of grant Y and of the "sync-unlock" or "loss" state (also referred to herein as "sync-unlock time"). "Head overlapping" and "Tail overlapping" refer to heads and tails of grant Y and their overlap with, respectively, a previous and a following grant. In effect, these illustrate the temporal malfunctions of early or late burst reception and early or late end of burst, explained in more detail below:

Early burst reception refers to the case in which an ONU turns-on its laser before the expected time. The outcome may be a bit error rate (BER) in the grant to an ONU immediately preceding the suspected ONU.

Late burst reception refers to the opposite of early burst reception, the reasons being similar. The outcome may be a BER detected in the transmission of the suspected ONU.

Early end of burst refers to the case in which an ONU turns off its laser before the expected time. The outcome could be a BER at the end of its grant. The reasons for an early end of burst may be a faulty ONU or bad ONU timing.

Late end of burst refers to the opposite of early end of burst. The reasons are similar. In this case, the outcome may be a BER at the grant start of the next ONU.

FIG. 1B shows the power transmission pattern of several ONUs a, b, c and d and illustrates potential laser power malfunctions in a PON. The figure shows a normal laser power signal ("ONU burst") 110 for ONUa as well as three possible power level malfunctions: a weak laser signal 112 for ONUb, a strong laser signal 114 for ONUc and an unstable laser signal 116 for ONUd, all explained in more detail below:

Weak laser signal refers to a failure in which the strength of the ONU signal is lower than expected. This can result from an increase in attenuation or degradation in the ONU's laser power.

Strong laser signal refers to a failure in which the strength of the ONU laser signal is higher than expected. This can result from a faulty operation of the ONU's laser power control.

Unstable laser signal refers to the laser power of a specific ONU being unstable and having random patterns.

A fourth power malfunction is defined as "Laser stuck at 1", which refers to the situation in which an ONU does not turn off its laser. The laser can transmit random data, idles, or "1"s, with the most likely events being idles and data. This malfunction can have a high impact on the network operation. It also has no specific characterization measurement and its existence is deduced from the behavior of the system.

At present, there are no known methods to detect these malfunctions/problems without intrusive access to the fiber infrastructure and without testing a suspected ONU component in a lab. It would therefore be advantageous to have methods and systems for active real time monitoring (diagnostics) of a PON, which provide information on various failure modes. Preferably, this monitoring should be done without placing any physical equipment at test points of the PON.

Rogue-ONU detection is one of the biggest challenges for carriers in deploying a time division multiplexed-passive optical network (TDM-PON). The challenge results from malfinctioning or malicious ONUs transmitting at different time periods than the ONUs are assigned to transmit. An ONU is supposed to transmit during, and only during, time intervals dynamically allocated to the ONU. This can lead to a degradation of service for properly-functioning ONUs. A major goal in a PON that includes an OLT and a plurality of ONUs is to detect degradation in the network behavior before a customer complains; in other words, before errors are evident on the line. The most critical aspect is fault isolation (i.e. finding a faulty ONU before it harms the performance of other ONUs). The specific fault of the ONU is less important, because the faulty ONU is likely to be replaced by the network operator.

The ITU-T (ITU Telecommunication Standardization Sector) GPON standard lacks several of the Ethernet PON (EPON) features that allow for simpler detection. Such EPON Features Include:

(1) "8B/10B" line-coding, which is a coding scheme that translates 8-bit data into 10-bit data and prevents long sequences of 1's and 0's; allowing the system to:
   (a) check the DC balance;

(b) check the comma sync-lock and -unlock time; and
(c) check for code errors; and
(2) a cyclic redundancy check (CRC) for every packet.

In contrast, in GPON environments, a scrambler is used to transmit the data without any redundancy. CRC exists only for the last frame field of a packet, and packets may spread over several grants (i.e. uplink transmission from an optical network terminal (ONT)). Furthermore, the sync-unlock time is not available in GPON environments.

In the GPON standard, there is no method to detect a rogue ONU in the network. Received signal-strength indication (RSSI) measurement is a powerful tool for identifying ONU transmission power. RSSI measurements can be used to help detect a rogue ONU, but RSSI measurements cannot be the only source of information. Limitations associated with such means of detection include:

(1) inaccurate power-level measurement, which can be up to 3 dB, prohibiting accurate interference identification;
(2) averaged RSSI measurement (taken over ~50-100 nanosecond interval), which prevents detection of timing errors; and
(3) limited A/D sampling rate, which prohibits having multiple data points within ONU transmission, preventing real-time response to other indicators.

It would be desirable to have systems and methods for detecting a rogue ONU in GPON environments. It would be further desirable to have such systems configured for simple hardware (HW) implementation, and preferably flexible software (SW) implementation as well.

SUMMARY OF THE INVENTION

It is the purpose of the present invention to provide systems and methods for detecting a rogue ONU in GPON environments.

For the purpose of clarity, several terms which follow are specifically defined for use within the context of this application. The term "rogue" is used in this application to refer to a malfunctioning ONU, which may or may not be interfering with network performance. The terms "frame" and "packet" are used interchangeably herein. The term "sync-lock time" is used in this application to refer to the actual time an ONU starts transmitting relative to an expected time. The term "sync-unlock time" is used in this application to refer to the actual time an ONU finishes transmitting relative to an expected time, which cannot be measured in GPON. The term "bit error" is used in this application to refer to error per ONU on a time scale from grant start or grant end. The term "delimiter" is used in this application to refer to a predefined sequence to indicate the start of a grant.

The present invention provides two general approaches for rogue-ONU detection that rely on:

(1) a byte error-counter (based on forward error correction (FEC) correctable errors); or
(2) determining an error density from a grant-start and grant-end error-counter that can operate:
   (a) with FEC (based on counting correctable errors at specific locations); or
   (b) without FEC (based on test pattern sequences).

Therefore, according to the present invention, there is provided for the first time a system for identifying faults in a GPON that includes an OLT and a plurality of ONUs, the system including: (a) a global error-counter, operationally connected to the OLT, for counting FEC-correctable errors, for each ONU, from a data stream from the GPON; and (b) a CPU for extracting an ONU status, indicative of a faulty ONU, contingent on the errors from the global error-counter.

Preferably, the system further includes: (c) a grant monitor operationally connected to, and operative to notify, the global error-counter of an expected granted ONU.

Most preferably, the grant monitor is configured to send a pre-determined PRBS to the OLT, and wherein the global error-counter is configured to count the errors based on the PRBS.

Preferably, the system further includes: (c) an FEC decoder for calculating a BER of the data stream, and for sending the BER to the global error-counter, wherein a BER threshold is indicative of a transmission error.

Preferably, the system further includes: (c) a MAC unit operative: (i) to detect a delimiter, indicative of a grant start, in an input data stream; (ii) to determine a timing of the grant start, and (iii) to send the timing to the global error-counter.

Most preferably, the input data stream is an optical data stream provided by an optical transceiver.

According to the present invention, there is provided for the first time a system for identifying faults in a GPON that includes an OLT and a plurality of ONUs, the system including: (a) a grant-start error-counter, operationally connected to the OLT, for counting grant-start errors, for each ONU, from a data stream from the GPON; (b) a grant-end error-counter, coupled to the OLT, for counting grant-end errors for each ONU; and (c) a CPU for extracting an ONU status, indicative of a faulty ONU, contingent on at least one parameter selected from the group consisting of the grant-start errors, the grant-end errors, and a combination thereof.

Preferably, the system further includes: (d) a grant monitor operationally connected to, and operative to notify, the grant-start error-counter and the grant-end error-counter of an expected granted ONU.

Most preferably, the grant monitor is configured to send a pre-determined PRBS to the OLT for determining locations of the grant-start errors and locations of the grant-end errors.

Preferably, the system further comprising: (d) an FEC decoder for calculating a BER of the data stream, and for sending the BER to the grant-start error-counter and the grant-end error-counter, wherein a BER threshold is indicative of a transmission error.

Preferably, the system further comprising: (d) a MAC unit operative: (i) to detect a delimiter, indicative of a grant start, in an input data stream; (ii) to determine a timing of the grant start; and (iii) to send the timing to the grant-start error-counter and the grant-end error-counter.

Most preferably, the input data stream is an optical data stream provided by an optical transceiver.

Preferably, the grant-start error-counter is configured to count errors in a first block of a FEC grant, and wherein the grant-end error-counter is configured to count errors in a last block of the FEC grant.

Preferably, the grant-start error-counter is configured to count errors in a first N-bytes of a FEC grant, and wherein the grant-end error-counter is configured to count errors in a last N-bytes of the FEC grant.

According to the present invention, there is provided for the first time a method for identifying faults in a GPON that includes an OLT and a plurality of ONUs, the method including the steps of: (a) counting FEC-correctable errors, for each ONU, from a data stream from the GPON using a global error-counter operationally connected to the OLT; and (b) contingent on the errors from the global error-counter, extracting an ONU status indicative of a faulty ONU.

Preferably, the method further includes the steps of: (c) prior to the step of counting, calculating a BER of the data stream using an FEC decoder; and (d) sending the BER to the global error-counter, wherein a BER threshold is indicative of a transmission error.

Preferably, the method further includes the steps of: (c) prior to the step of counting, detecting a delimiter in an input data stream using a MAC unit, wherein the delimiter is indicative of a grant start; (d) determining a timing of the grant start using the delimiter; and (e) sending the timing to the global error-counter.

According to the present invention, there is provided for the first time a method for identifying faults in a GPON that includes an OLT and a plurality of ONUs, the method including the steps of: (a) counting grant-start errors, for each ONU, from a data stream from the GPON using a grant-start error-counter, operationally connected to the OLT; (b) counting grant-end errors for each ONU using a grant-end error-counter, operationally connected to the OLT; and (c) extracting an ONU status, indicative of a faulty ONU, contingent on at least one parameter selected from the group consisting of the grant-start errors, the grant-end errors, and a combination thereof.

Preferably, the method further includes the steps of: (d) prior to the step of counting grant-start errors, calculating a BER of the data stream using an FEC decoder; and (e) sending the BER to the grant-start error-counter and the grant-end error-counter, wherein a BER threshold is indicative of a transmission error.

Preferably, the method further includes the steps of: (d) prior to the step of counting grant-start errors, detecting a delimiter in an input data stream using a MAC unit, wherein the delimiter is indicative of a grant start; (e) determining a timing of the grant start using the delimiter; and (f) sending the timing to the grant-start error-counter and the grant-end error-counter.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

Figure 3:
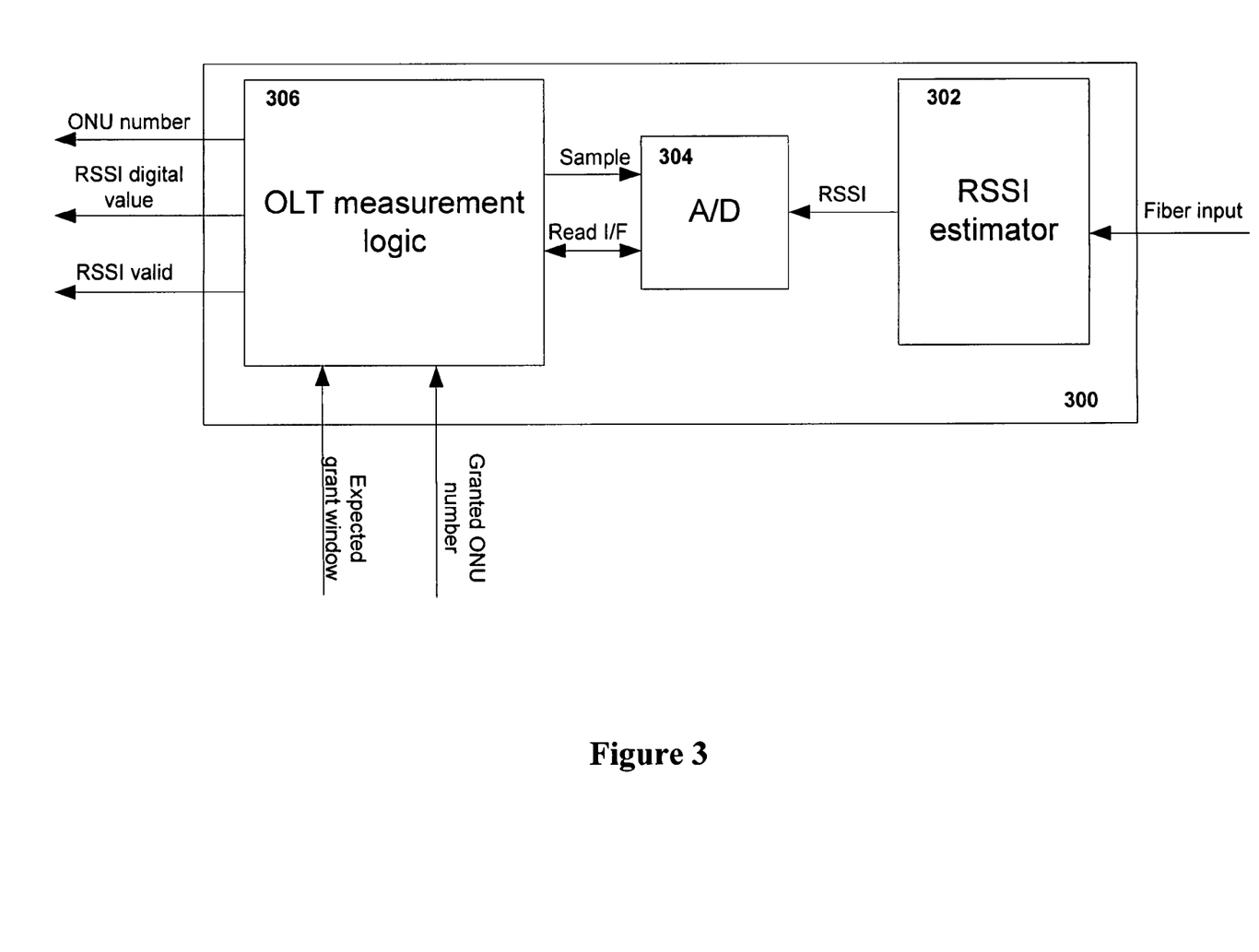
FIG. 3 shows a Receive Signal Strength Indication (RSSI) measurement subsystem.

The present invention relates to systems and methods for detecting a rogue ONU in GPON environments. A PON diagnostics system and method is disclosed that provide an operator with the ability to identify and isolate problems in real time in a PON. The system includes software (SW) that can analyze the collected results and provide information about existing or potential malfunctions/problems. The diagnostics method provides an operator with one or more of the following parameters:

"Laser power", presented per ONU and measured with the subsystem of FIG. 3. "Sync-lock time", i.e. the actual time the ONU starts its transmission relative to an expected time. "Byte error", an addition to the standard based on FEC-corrected error and presented per ONU on a timescale from grant start or grant end.

The type of malfunction is identified, per ONU or group of ONUs, from an analysis of one parameter or a combination of these parameters.

The BER for each ONU is sampled periodically. If there are errors (in terms of correctable bytes), then further measurements (correctable bytes, sync-lock time and/or laser power) are made, also periodically. These measurements follow one (or both) of two scenarios: "Scenario 1", used if no more errors are detected and "Scenario 2", used after further errors are detected. Scenario 1 is a simple go/no-go scenario.

Figure 2:
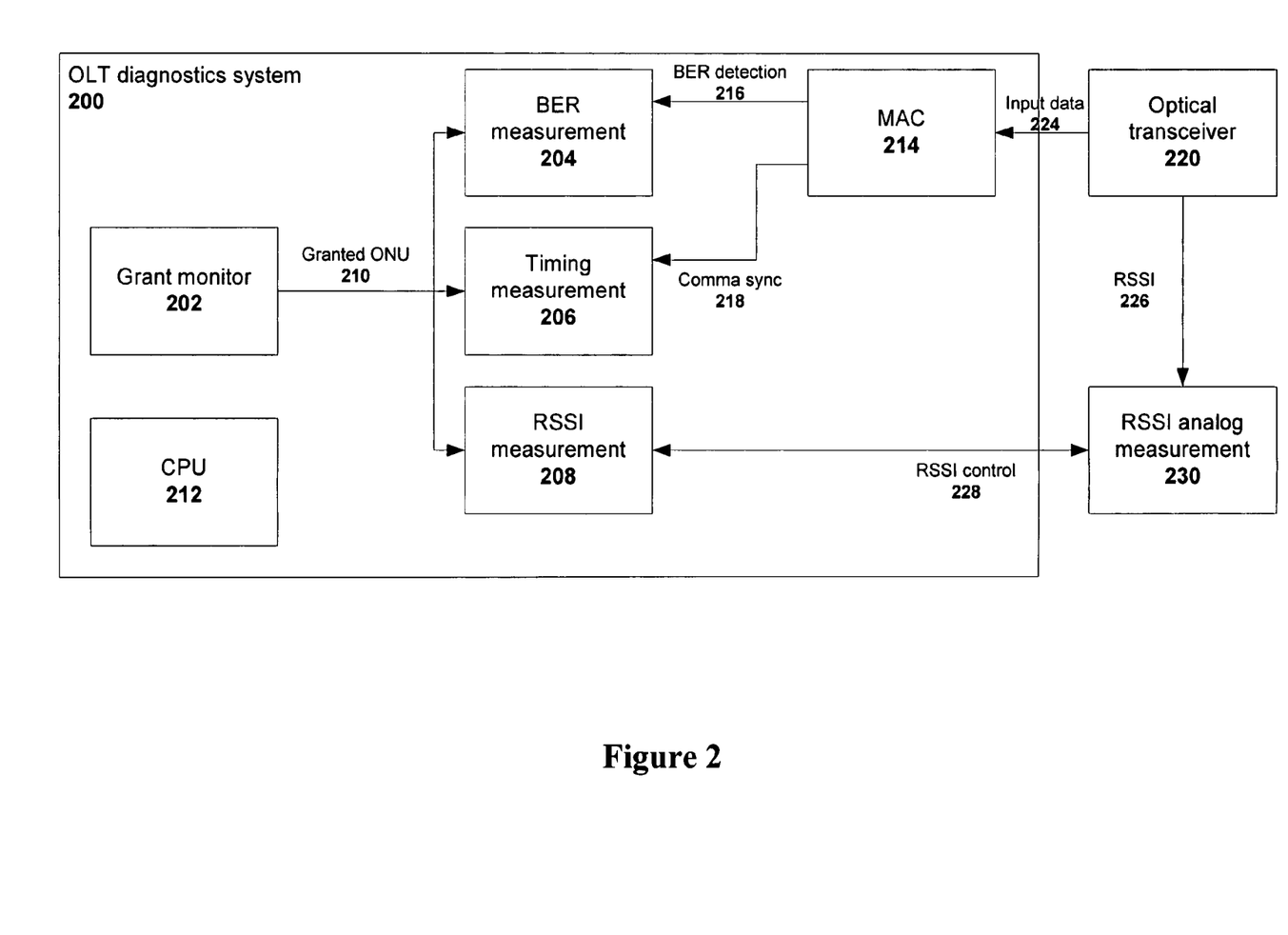
FIG. 2 shows an OLT diagnostic system.

FIG. 2 shows an OLT diagnostic system 200. The system is operative to perform diagnostics of each ONU through both temporal measurements and laser power measurements. The laser power measurements are performed using a subsystem 300 shown in FIG. 3. System 200 includes subsystem 300.

In more detail, system 200 comprises a grant monitor 202; a BER measurement module 204 operative to perform transmission error measurements from received BER data 216; a timing measurement module 206 (identical with subsystem 400) operative to perform sync-lock measurements based on delimiters received in a data stream 218; and a Receive Signal Strength Indication (RSSI=laser power) measurement module 208 operative to perform laser power measurements. Grant monitor 202 is coupled to all three modules 204, 206, and 208 and operative to notify them of the expected granted ONU through notifications 210. System 200 further comprises a central processing unit (CPU) 212 coupled to all modules/units and used for running the algorithms (scenarios) described in more detail below. CPU 212 acts essentially as a logic device operative to extract an ONU status indicative of a fault based on at least one temporal parameter (sync-lock time), laser power parameter or a combination thereof. System 200 further comprises a media access control (MAC) unit 214 used to detect code errors in an incoming data stream 224. MAC unit 214 provides a BER detection data stream to module 204 and the sync data stream 218 to module 206.

System 200 is coupled to an optical transceiver 220 and to an RSSI analog measurement subsystem 230. The connection to subsystem 230 is through an RSSI control interface 228. Transceiver 220 is operative to receive optical signals from each ONU and to provide data stream 224 to MAC 214 and a RSSI analog data stream 226 to subsystem 230. Subsystem 230 comprises an analog-to-digital (A/D) converter ("ADC", see also ADC 304 in FIG. 3) and a RSSI sampling element (not shown). Data 224 is converted to digital signals before its input to the MAC unit. RSSI analog data stream 226 is converted to a digital data stream by ADC 304 in module 230. RSSI control interface 228 also controls the RSSI sampling element.

FIG. 3 shows in more detail RSSI measurement subsystem 300. System 300 comprises a RSSI estimator module 302 operative to receive a data input ("Fiber input") and to output an analog RSSI (laser power) signal; an ADC 304 operative to hold the RSSI signal stable during the time the analog value is converted to a digital RSSI value; and an OLT measurement logic 306 that resides in the OLT and is operative to provide "sample" inputs to the ADC and to receive the digital RSSI value from ADC 304 at a programmable time from grant start through a digital interface Read I/F (typically I2C). Logic 306 is further operative to track the expected transmission of the ONUs, indicating which ONU is expected to transmit and when. In essence, logic 306 comprises grant monitor 202 plus a timing element (not shown) that controls the relative timing of the sample within the grant. The results are provided with a validity indication ("RSSI valid") and the number of the ONU for which the measurement was taken ("ONU number"). Logic 306 is controlled by SW in the OLT (not shown), which processes the received RSSI value. The RSSI value is stored per ONU, and allows the SW to do the processing mentioned below. Note that subsystem 300 essentially includes elements 208, 220, and parts of module 230 in FIG. 2.

To clarify, subsystem 300 is used to measure the "laser power" parameter. The measurement samples the transmission from the ONU at a programmable time from grant start. RSSI is measured during the grant. Several measurements can be collected and averaged. The values are analyzed by the SW by comparison with absolute allowed values or with previous values measured for the specific ONU. The determination of the measurement point is performed using a sample-and-hold mechanism (not shown) inside A/D converter 304.

"Lock event" refers to respective pulses during the event of the change. A SW database (not shown) stores the relative time of receiving the delimiter, per each ONU. An "expected granted ONU" input is used later to identify the ONU on which the measurement was taken, and use the ONU index to store the measurement in the correct entry of the database. A "CPU interface" is used for accessing the database.

It will be apparent to one skilled in the art that some of the modules/functions described above can be implemented in hardware, some in software and some in combinations of hardware and software.

Early Burst Reception

There are two measurements performed to detect this malfunction. Their order is interchangeable.

Scenario 1: Detection of the uplink delimiter of each ONU. If the delimiter arrives early, then an alarm is raised in SW. Several methods of raising alarms are known in the art and may be employed for the purposes set forth herein.

Scenario 2: Measurement of transmission errors (BER) during the transmission of each ONU. When transmission errors are detected for an ONU (e.g. ONU N), the time until the next granted ONU (also referred to herein as "distance to next grant") is increased by the OLT. The distance increase represents an increase in the gaps between timeslots allotted to two consecutively transmitting ONUs. If errors are not detected anymore for the same ONU N, then the ONU granted following ONU N is suffering from a too early burst reception. In essence, the fault detection is done by checking ONU N, with the deduction being that the faulty ONU is the ONU granted immediately following ONU N.

Late Burst Reception

The same two measurements serving early burst reception are also used in late burst reception:

Scenario 1: As above, the delimiter of each ONU is detected. If the delimiter arrives late, then an alarm is raised in SW.

Scenario 2: Measurement of the transmission errors during the transmission of each ONU. When transmission errors are detected in ONU N, the distance to the next grant is increased. If errors are still detected, the distance from an immediately preceding grant is increased. If errors are still detected, then the problem resides in ONU N, which suffers from either late burst reception or early end termination. Differentiation between these problems is not required, since the faulty ONU module needs to be replaced in both cases.

Weak Laser Signal

There are two measurements to detect this malfunction:

(1) Measuring the laser power during a grant and detecting a low result.

(2) Measuring the overall corrected FEC bytes and obtaining a high value.

Scenario 1: A database (not shown) connected to OLT measurement logic 306 holds the power level transmitted from each ONU. If the results received during several power measurements are lower than a minimal configurable threshold or a previous result (referred to henceforth as a "known minimal power value"), an alarm is raised.

Scenario 2 kicks in if the transmission errors of any ONU were above the minimal configurable threshold and/or the previous result. The grant of the probed ONU, for which errors were detected, is kept apart from other grants. If errors are still observed, then the laser power of each ONU is measured. If the power is low only for the specific (probed) ONU, then the specific fiber drop connected to the probed ONU needs to be checked and the ONU may need to be replaced. If several ONUs are suffering from low power, then this indicates an infrastructure problem, which can be identified based on the ONUs sharing the same fiber leafs.

Strong Laser Signal

The same measurements serving to detect a weak laser signal are also used in a strong laser signal malfunction.

Scenario 1 uses the same database described above that holds the power level transmitted from each ONU. If the laser power results received during several measurements are higher than a maximal configurable threshold or a previous result (referred to henceforth as a "known maximal power value"), an alarm is raised.

Scenario 2 is identical with scenario 2 of a weak laser signal, except that the checking is done for a high power value of an ONU.

Laser Stuck at 1

There are three measurements to detect this malfunction, and all three need to be evaluated together:

(1) Measuring which ONUs are logically connected, as indicated from the ONU registration state machine. When all ONUs are disconnected due to an "interrupting" ONU, only a single, "suspicious" ONU is still connected.

(2) Measuring the corrected bytes and discovering a high value—the other ONUs will suffer from corrected bytes distributed randomly throughout the grant.

(3) Measuring the laser signal at the time signal should have no power—the result would be higher than expected.

Unstable Laser Signal

There is one measurement to detect this malfunction: measuring the transmission power of an ONU during several grant transmissions, and comparing a deviation of these measurements with a configurable power level. If the deviation exceeds an allowed value, an alarm is raised, see item 208 in FIG. 2.

Figure 4:
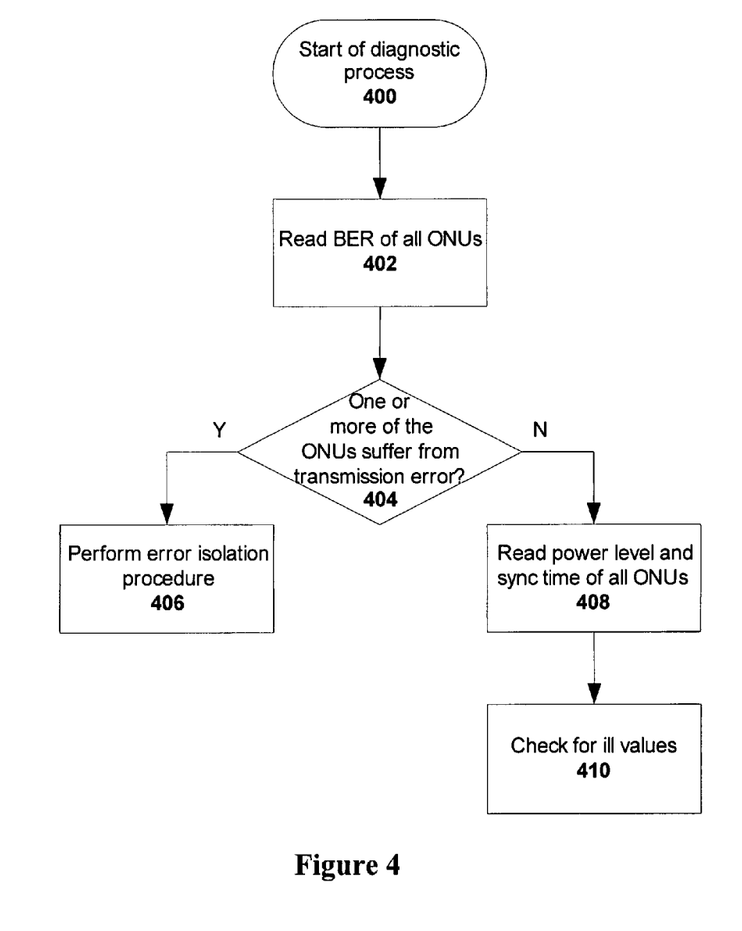
FIG. 4 shows the major steps of a process for fault isolation.

FIG. 4 shows the major steps of the method for detecting and isolating problems and malfunctions in a PON. The diagnostic process starts in Step 400, where a periodical timer triggers periodic checks. The transmission errors of all ONUs are read in Step 402. If, based on the corrected bytes, one or more ONUs are found to suffer from transmission errors in a check Step 404, the system performs a transmission error isolation procedure in Step 406. If none of the ONUs suffer from transmission errors in Step 404, the power level and sync time of each ONU is read in Step 408, and all "bad" ("ill") values are checked in Step 410 in order to notify the system of a potential fault.

Figure 5:
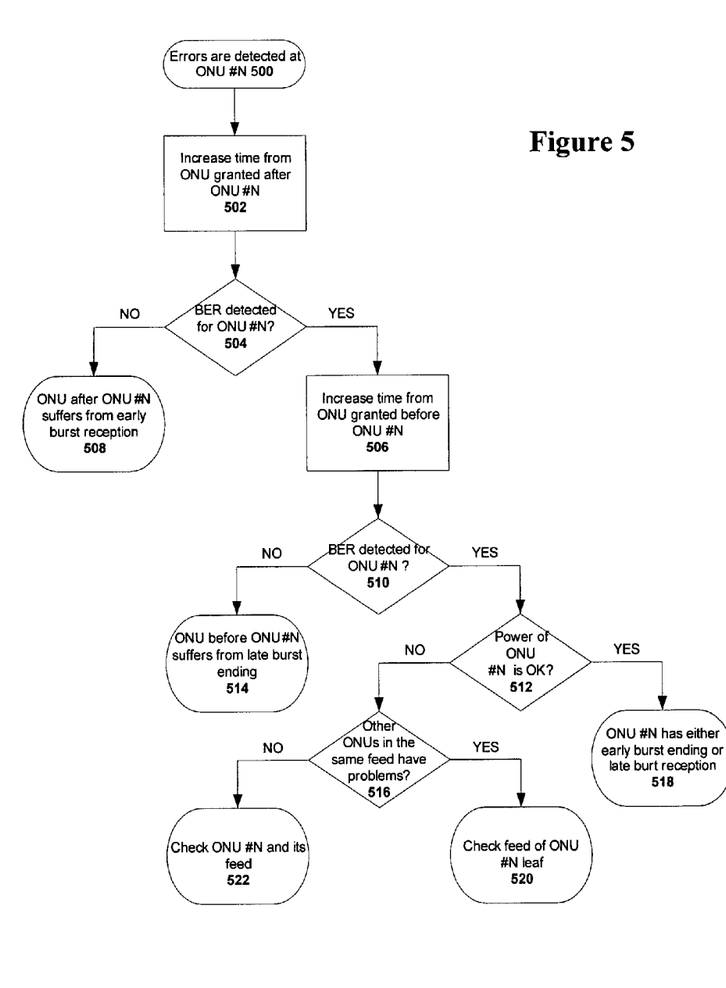
FIG. 5 shows a detailed example for the process of fault isolation.

The flow diagram in FIG. 5 presents a detailed exemplary error isolation procedure (details of Step 406). The operation begins after transmission errors are detected in Step 500 (equivalent to Step 404 in FIG. 4) for ONU N. The first action taken in Step 502 is to increase the "time to grant" until the ONU after ONU N is granted. In Step 504, a check is made again for errors in ONU N. If the transmission errors disappear, ONU N is not faulty, but the ONU granted after ONU N is. The operation moves to Step 508, where an alarm is raised for the faulty ONU as suffering from an early burst reception. If the errors persist in ONU N, the operation resumes from Step 506, where the time to grant from the ONU granted before ONU N is increased. Errors are rechecked in Step 510 for ONU N. If the errors stop, then the operation completes in Step 514, where an alarm is raised for the ONU granted before ONU N as suffering from a late end of burst. If the errors persist in Step 510, the power level of ONU N is checked in Step 512. If the power level is good, the operation completes in Step 518 with an alarm raised for ONU N for a timing problem. If the power level is not good, execution continues from Step 516. The performance of other ONUs in the same leaf is checked starting from Step 512. If any of those ONUs suffer from errors, then all the leaf is tested in Step 520. If only ONU N experiences problems, then ONU N and its feed are checked physically (e.g. by a technician) in Step 522.

Note that the flow in FIG. 5 is for illustrative purposes only, and that the order of some steps may be changed and reversed. For example, the order of the checks can be swapped, i.e. instead of separating the grants in the time domain so that the OLT first grants the ONU before the one with transmission errors, the OLT can first grant the ONU after the ONU with transmission errors.

Figure 6:
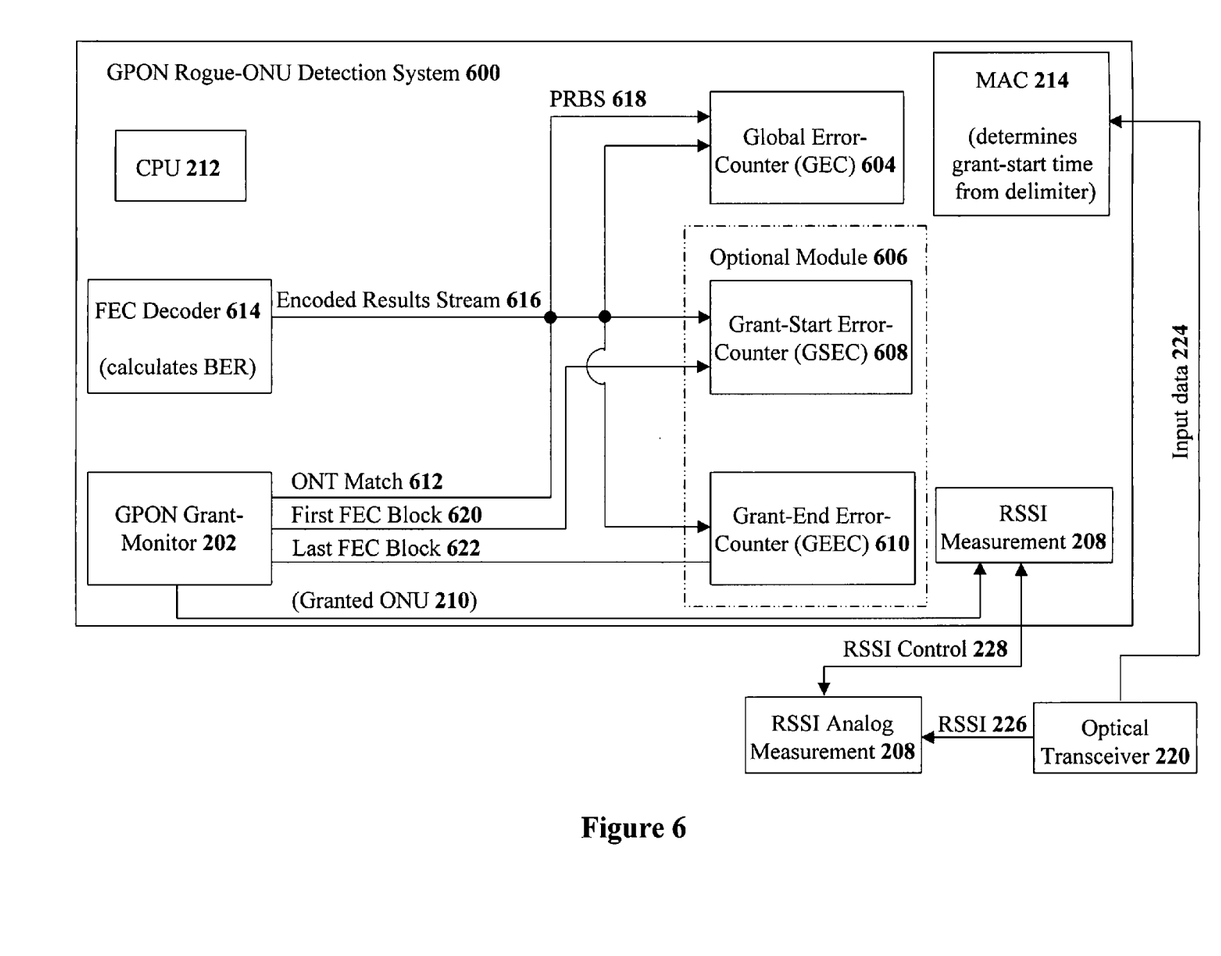
FIG. 6 is a simplified schematic block diagram of a system for rogue-ONU detection in a GPON, according to the present invention.

FIG. 6 shows a simplified schematic block diagram of a system 600 for rogue-ONU detection in a GPON, according to the present invention. System 600 includes essentially all the components of system 200, with a GPON grant-monitor 202 also coupled to a global error-counter (GEC) 604, to an optional module 606 and to an FEC decoder 614, in addition to its previous connections. Module 606 includes a grant-start error-counter (GSEC) 608 and a grant-end error-counter (GEEC) 610 and is used to implement the GSEC/GEEC approach described below. In the GSEC/GEEC approach embodiment, module 606 provides additional information to the GEC approach for detecting rogue ONUs. GPON grant-monitor 202 is operative to notify GEC 604, GSEC 608, and/or GEEC 610 of the expected granted ONU via an ONT match 612 (i.e. a match between the expected granted ONU and ONT). FEC decoder 614 calculates the BER (as opposed to system 200 of FIG. 2 which measures the BER), and provides the BER in an encoded results stream 616 to GEC 604, GSEC 608, and/or GEEC 610. Like system 200, system 600 includes a CPU (CPU 212) coupled to all modules/units and used for executing the protocols in the approaches described below. To clarify, the general architecture of system 600 of FIG. 6 is similar to system 200 of FIG. 2, except for modifications required to implement rogue-ONU detection in GPON. Note that in system 600, MAC 214 determines the grant-start time from the arrival of the delimiter (as opposed to MAC 214 in system 200 of FIG. 2, which measures the timing of the start of the grant via timing measurement 206). System 600 is used to implement two approaches for detection of a rogue ONU.

Figure 7:
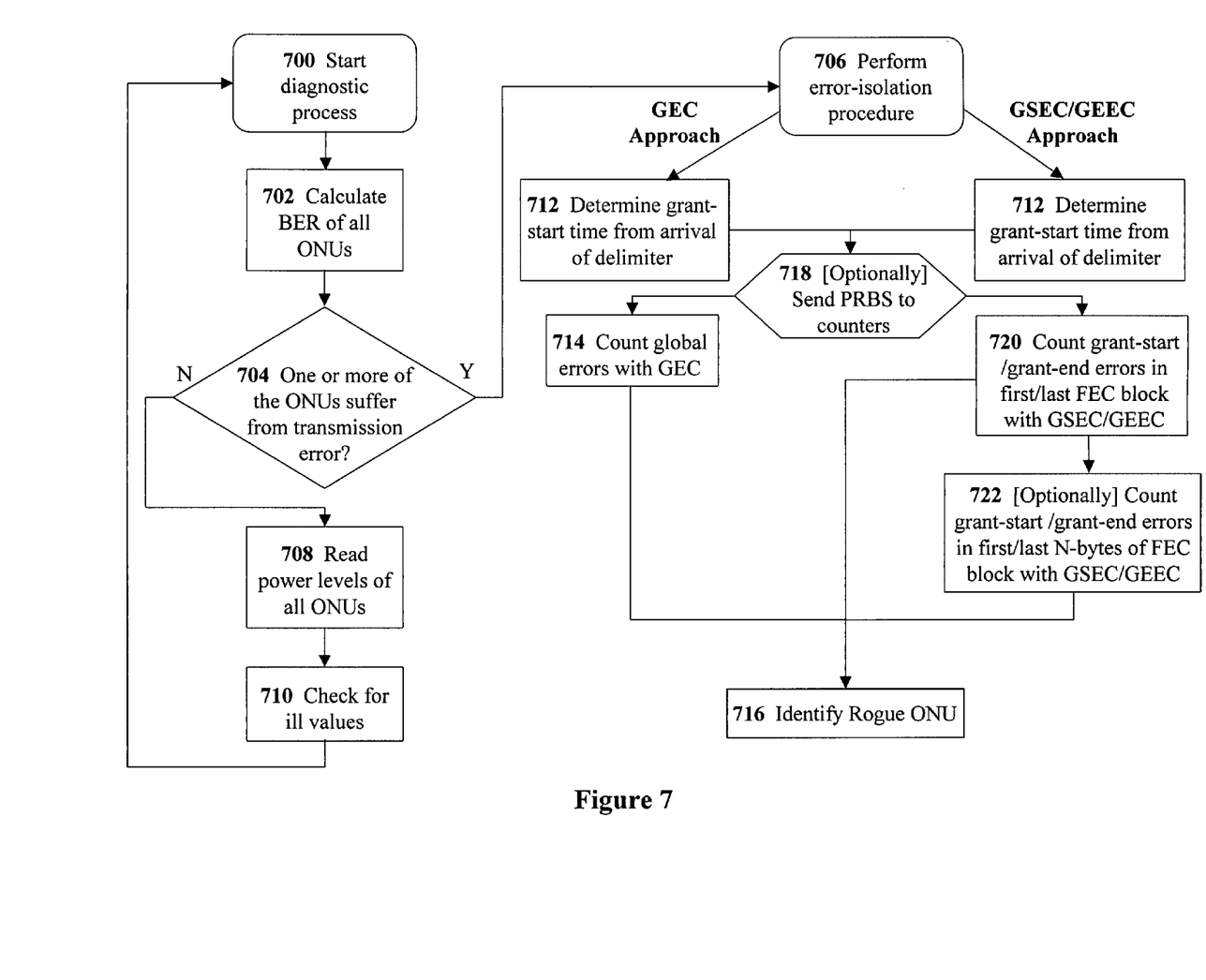
FIG. 7 shows the major data/information-collecting steps of a process for fault isolation, according to the present invention.

FIG. 7 shows the major data/information-collecting steps of a process for fault isolation, according to the present invention. The diagnostic process is started (Step 700), and a BER is calculated for all ONUs (Step 702). The BER indicates whether there is a transmission error in any of the ONUs (Step 704). If there are transmission errors, then an error-isolation procedure is initiated (Step 706). If there are no transmission errors, then the power levels of all ONUs are read (Step 708) and checked for ill values (Step 710). Up to Step 710, the scheme of FIG. 7 closely resembles the scheme of FIG. 4.

The error-isolation procedure (Step 706) includes two approaches. Both approaches begin by the MAC determining the grant-start time from the arrival of the grant delimiter (Step 712). The first approach (named "GEC approach") utilizes a global byte-error-counter (GEC 604) to count FEC-correctable errors (Step 714) and to identify rogue ONUs (Step 716). GPON frameworks utilize a bit-interleaved parity (BIP) mechanism for error detection (code BIP-8 for code words of one byte). The performance of the BIP-8 mechanism is limited by the error probability and the number of bytes participating in the calculation. For a high error-probability and high number of bytes participating in the calculation, more than one error can occur in the parity associated with one bit.

Specific to GPON environments, the uplink grant transmission is typically up to 125 microseconds long, which equals 155,520, bits or 19,440 bytes. Given such an uplink grant transmission, the maximum error rate is approximately equal to the number of bytes squared or $(19,440)^2$. A BER higher than $2.7 \times 10^{-9}$ will be inaccurate, and a BER higher than $5 \times 10^{-5}$ will be totally unreliable. Since the BER threshold for adequate accuracy and reliability is $10^{-4}$, a different mechanism is required. The BER for each ONU is sampled periodically. If there are errors (in terms of BER), then further measurements (e.g. BER, sync-lock time, and/or laser power) are made, also periodically. These measurements follow one (or both) of two cases: The first case occurs when no more errors are detected, and the second case occurs after further errors are detected. BER is based on either corrected bytes when FEC is activated, or on a pseudo-random binary sequence (PRBS) 618 feedback pattern when FEC is not activated (optional Step 718 in FIG. 7).

The FEC provides, as a by-product, a count of the corrected errors. This gives a good indication as to the number of errors on the line when the FEC is activated. The maximum number of errors detected in one block is eight. Beyond this error limit, uncorrectable block indication will be asserted by the FEC block. In this case, the GEC 604 should be incremented by nine (i.e. the most-likely number of errors), although GEC 604 can be set to a higher value as well. To be more precise, the higher the BER, the higher the weight assigned for uncorrectable blocks, but since such a BER is not a normal threshold, there is no need for better accuracy.

The GEC approach of the present invention involves counting and analyzing such errors, providing an indication for signal degradation. GEC 604 sums the number of errors in the downlink at any given ONU. At the OLT, a respective GEC 604 for each ONU sums the number of errors from each ONU.

A second approach (named "GSEC/GEEC approach") utilizes the determination of an error density to detect rogue ONUs. Returning to FIG. 7, the error-isolation procedure (Step 706) continues with the MAC determining the grant-start time from the arrival of the grant delimiter (Step 712). An error density is determined (Step 720) from a grant-start and grant-end error-counter (GSEC 608 and GEEC 610, respectively, in optional module 606 of FIG. 6). The location of error in the grant can indicate the presence of a rogue ONU (Step 716). For example, if the errors are located mostly at the start of a grant, then the errors are most likely a result of a slow laser "turn-on" time, a slow OLT lock mechanism, or a slow laser "turn-off" time of a previous ONU. If the errors are located at the end of the grant, then the errors are most likely a result of a clock drift of the ONU, or the laser turn-on time for the next ONU occurred prematurely. It is noted again that the GSEC/GEEC approach serves as a "second-level" rogue-ONU detection method to the GEC approach.

In order to provide a simple implementation, two different embodiments are presented for the GSEC/GEEC approach: the first embodiment is used when the FEC is activated, and the second one is used when the FEC is not activated.

The GSEC/GEEC approach with FEC activated is based on counting correctable error at specific locations. As mentioned above, the FEC indicates the number of corrected symbols in a block, where the GPON FEC block is 255 bytes long. In addition to the already defined general counter (GEC 604), two additional counters are defined:
  (1) first block counter (GSEC 608) that counts the number of errors only at a first FEC block 620 from GPON grant-monitor 202, and
  (2) last block counter (GEEC 610) that counts the number of errors only at a last FEC block 622 from GPON grant-monitor 202.

Using this information, the error density at the start or end of a grant can be analyzed and indicate potential problems such as a rogue ONU.

A preferred embodiment of this approach involves counting the errors in the first N-bytes and last N-bytes of the grant (Step 722 of FIG. 7). The FEC issues a vector with the serial number of corrected symbols. For the first N-bytes in a packet, GSEC 608 counts the number of corrected errors in first FEC block 620. For the last N-bytes in a packet, GEEC 610 counts the number of corrected errors in last FEC block 622. In order to avoid complicating the approach, N should be smaller than 18 bytes; otherwise, two blocks could be potentially checked. Such a constraint is not a significant limitation.

The preferred embodiment of the "N-byte approach" described above has higher granularity than the general GSEC/GEEC approach. Nevertheless, if the implementation does not provide the FEC vector, the general GSEC/GEEC approach is a reasonable compromise.

The GSEC/GEEC approach without the FEC being activated is based on test pattern sequences. When FEC is not activated, there is no indication for errors beside the BIP mechanism. Thus, the error density is unknown.

A simple solution involves sending pre-determined PRBS 618 from GPON grant monitor 202 (Step 718 of FIG. 7). The OLT receiving the sequence is able to identify precisely an error's location by comparing the received data to internally-generated PRBS 618. For that reason, the OLT is configured to accept the packet even when the CRC fails. In this case, the OLT simply ignores the FEC check (i.e. the CRC). Alternatively, such a packet may not have CRC at all.

For simplicity, the packet can be as long as the entire grant, and can be requested by the OLT. A similar GSEC/GEEC approach can also be used when FEC is activated, but the approach requires a bypass of the packet in the MAC layer to avoid error correction. It is noted that once the errors are corrected, the PRBS content is useless.

All patent applications mentioned in this specification are herein incorporated in their entirety by reference into the specification, to the same extent as if each individual patent application was specifically and individually indicated to be incorporated herein by reference. In addition, citation or identification of any reference in this application shall not be construed as an admission that such reference is available as prior art.

While the invention has been described with respect to a limited number of embodiments, it will be appreciated that many variations, modifications, and other applications of the invention may be made.

What is claimed is:

1. A system for identifying faults in a gigabit passive optical network (GPON) that includes an optical line terminal (OLT) and a plurality of optical network units (ONUs), the system comprising:
  a global error-counter, operationally connected to the OLT, for counting forward-error-correction-(FEC)-correctable errors and for indicating uncorrectable blocks, for each ONU, from a data stream from the GPON; and
  a central processing unit (CPU), operationally connected to the OLT, for extracting an ONU status, indicative of a faulty ONU, based on said counts of said FEC-correctable errors from said global error-counter and on said indications of said uncorrectable blocks from said global error-counter.

2. The system of claim 1, the system further comprising:
  a grant monitor operationally connected to, and operative to notify, said global error-counter of an expected granted ONU.

3. The system of claim 2, wherein said grant monitor is configured to send a pre-determined pseudo-random binary sequence (PRBS) to the OLT, and wherein said global error-counter is configured to count said errors based on said PRBS.

4. The system of claim 1, the system further comprising:
  an FEC decoder for calculating a bit error rate (BER) of said data stream, and for sending said BER to said global error-counter, wherein a BER threshold is indicative of a transmission error.

5. A method for identifying faults in a gigabit passive optical network (GPON) that includes an optical line terminal (OLT) and a plurality of optical network units (ONUS), the method comprising the steps of:
  (a) counting forward-error-correction-(FEC)-correctable errors and indicating uncorrectable blocks, for each ONU, from a data stream from the GPON using a global error-counter operationally connected to the OLT; and
  (b) based on said counts of said FEC-correctable errors from said global error-counter and on said indications of said uncorrectable blocks from said global error-counter, extracting an ONU status indicative of a faulty ONU, using a CPU (central processing unit) operationally connected to the OLT.

6. The system of claim 5, the method further comprising the steps of:
  (c) prior to said step of counting, calculating a bit error rate (BER) of said data stream using an FEC decoder; and
  (d) sending said BER to said global error-counter, wherein a BER threshold is indicative of a transmission error.

7. A system for identifying faults in a gigabit passive optical network (GPON) that includes an optical line terminal (OLT) and a plurality of optical network units (ONUs), the system comprising:
  a global error-counter, operationally connected to the OLT, for counting forward-error-correction-(FEC)-correctable errors and for indicating uncorrectable blocks, for each ONU, from a data stream from the GPON;

a central processing unit (CPU) for extracting an ONU status, indicative of a faulty ONU, based on said counts of said errors from said global error-counter and on said indications of said uncorrectable blocks from said global error-counter; and a media access control (MAC) unit operative:
  to detect a delimiter, indicative of a grant start, in an input data stream;
  to determine a timing of said grant start; and
  to send said timing to said global error-counter.

8. The system of claim 7, wherein said input data stream is an optical data stream provided by an optical transceiver.

9. A method for identifying faults in a gigabit passive optical network (GPON) that includes an optical line terminal (OLT) and a plurality of optical network units (ONUs), the method comprising the steps of:

(a) counting forward-error-correction-(FEC)-correctable errors and indicating uncorrectable blocks, for each ONU, from a data stream from the GPON using a global error-counter operationally connected to the OLT;

(b) based on said counts of said FEC-correctable errors from said global error-counter and on said indications of said uncorrectable blocks from said global error-counter, extracting an ONU status indicative of a faulty ONU;

(c) prior to said step of counting, detecting a delimiter in an input data stream using a media access control (MAC) unit, wherein said delimiter is indicative of a grant start;

(d) determining a timing of said grant start using said delimiter; and (e) sending said timing to said global error-counter.

* * * * *